(12) United States Patent
Yu

(10) Patent No.: US 7,216,190 B2
(45) Date of Patent: May 8, 2007

(54) SMALL ELECTRONIC CARD WITH PERIPHERAL CONTACTS

(75) Inventor: Gordon Yu, Taipei (TW)

(73) Assignees: C-One Technology Corporation, Hsin-Chu City (TW); Pretec Electronics Corporation, Fremont, CA (US)

( * ) Notice: Subject to any disclaimer, the term of this patent is extended or adjusted under 35 U.S.C. 154(b) by 163 days.

(21) Appl. No.: 10/919,302

(22) Filed: Aug. 17, 2004

(65) Prior Publication Data

US 2005/0149679 A1    Jul. 7, 2005

(30) Foreign Application Priority Data

Jan. 6, 2004    (TW) ............... 93100266 A

(51) Int. Cl.
*G06F 13/00*    (2006.01)
*G06F 12/00*    (2006.01)
*G06K 19/06*    (2006.01)
*H05K 1/14*    (2006.01)
*H05K 5/00*    (2006.01)

(52) U.S. Cl. ............ 710/301; 710/300; 711/115; 361/737; 361/752; 235/492; 235/487

(58) Field of Classification Search ........... 711/115; 710/301

See application file for complete search history.

(56) References Cited

U.S. PATENT DOCUMENTS

| | | | |
|---|---|---|---|
| 5,619,660 A * | 4/1997 | Scheer et al. | 710/301 |
| 5,649,224 A * | 7/1997 | Scheer | 710/300 |
| 6,434,034 B1 * | 8/2002 | Wallace et al. | 365/52 |
| 6,945,465 B2 * | 9/2005 | Nishizawa et al. | 235/492 |
| 7,009,846 B1 * | 3/2006 | Wang et al. | 361/737 |
| 2005/0052924 A1 * | 3/2005 | Nishizawa et al. | 365/222 |
| 2005/0230484 A1 * | 10/2005 | Cuellar et al. | 235/492 |
| 2006/0049265 A1 * | 3/2006 | Ho et al. | 235/492 |

* cited by examiner

*Primary Examiner*—Glenn A. Auve
*Assistant Examiner*—Brian Misiura
(74) *Attorney, Agent, or Firm*—Bacon & Thomas, PLLC

(57) ABSTRACT

A small electronic card with peripheral contacts includes a body, a plurality of front end contacts and a plurality of extended contacts placed along the two side edges. The plurality of extended contacts are used for increasing the data transmission bandwidth, and thus the data transmission speed, and the arrangement of the extended contacts does not affect the design of the reader, while preventing short circuit caused by pins touching incorrect contacts.

8 Claims, 4 Drawing Sheets

SMALL ELECTRONIC CARD WITH PERIPHERAL CONTACTS

BACKGROUND OF THE INVENTION

1. Field of the Invention

The present invention relates to a small electronic card, and, more particularly, to a small electronic card with peripheral contacts.

2. Description of the Related Art

Development in electronic technology has accelerated the growth in the popularity of many types of portable computing products, such as notebooks, palm computers and PDAs; and various types of commercial electronic products, such as digital cameras, digital video players and MP3 players. In general, both portable computing products and commercial electronic products may utilize a small memory card, such as MS memory card 41 shown in FIG. 4, for data storage, and other types of small electronic cards for peripheral functions, such as network cards or modem cards.

A prior art technique provides a small electronic card with a single line of contacts, which generally does not provide a sufficient number of contacts for interfacing purposes.

Please refer to FIG. 1. Another prior art technique provides a small electronic card 11 with double (parallel) lines of contacts 112, which on one hand can satisfy interfacing requirements, but on the other hand causes difficulty to design the reader. As shown in FIG. 2, in order to read the contacts 111 and 112, pins 26 of the reader 25 need to be bent to avoid touching the contact 111 or 112, which would otherwise cause a short circuit. However, the bent pin 26 is easily broken and difficult to manufacture. Alternatively, as shown in FIG. 3, another reader 35 has pins 36 placed on both the upper side and lower side for contacting front and back contacts, but this design increases the reader's height and does not follow the trend of miniaturization.

Therefore, it is desirable to provide a small electronic card with peripheral contacts to mitigate and/or obviate the aforementioned problems.

SUMMARY OF THE INVENTION

A main objective of the present invention is to provide a small electronic card with peripheral contacts, which provides more contacts without affecting the design of the reader.

Another objective of the present invention is to provide a small electronic card with peripheral contacts, which can prevent short circuit caused by pins touching incorrect contacts.

To achieve the objective, a small electronic card with peripheral contacts capable of being inserted into a reader is provided, which comprises: a body having a front end and two side edges, the two side edges facing each other and disposed behind two sides of the front end, the body being inserted into the reader from the front end; a plurality of front end contacts placed along the front end of the body; and a plurality of extended contacts placed along the two side edges, wherein every side edge has at least one extended contact.

Furthermore, the reader has a plurality of pins which are placed at positions corresponding to the side edges of the body, and are used for electrically connecting to the front end contacts and a plurality of extended contacts of the small electronic card.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
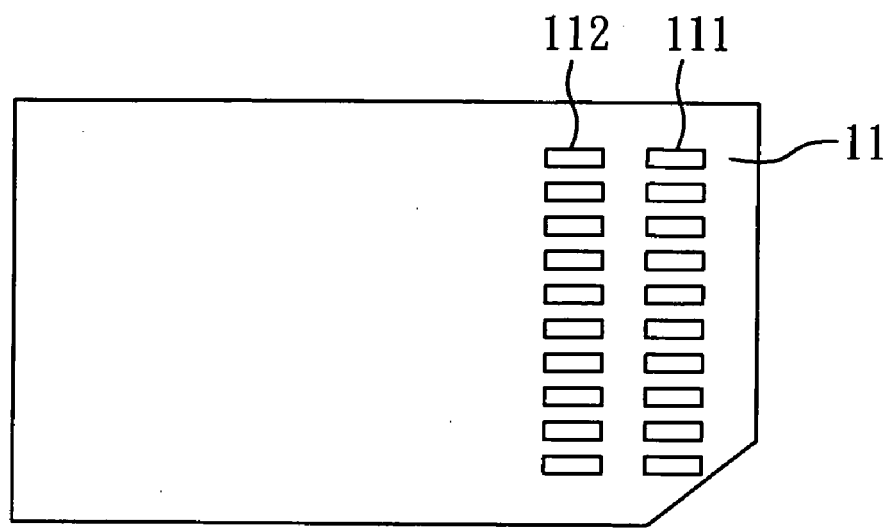
FIG. 1 is a schematic drawing of a small electronic card with double contact lines.
Figure 2:
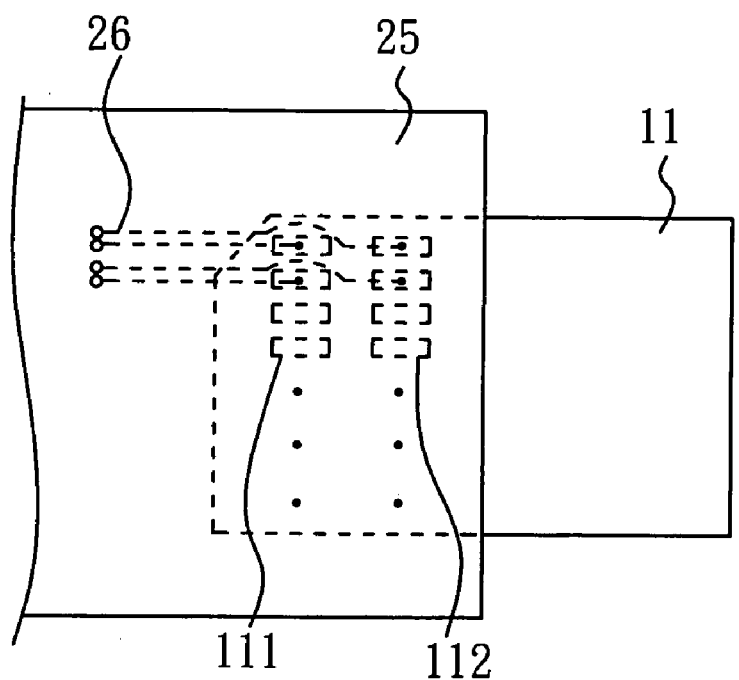
FIG. 2 is a schematic drawing of a prior art reader.
Figure 3:
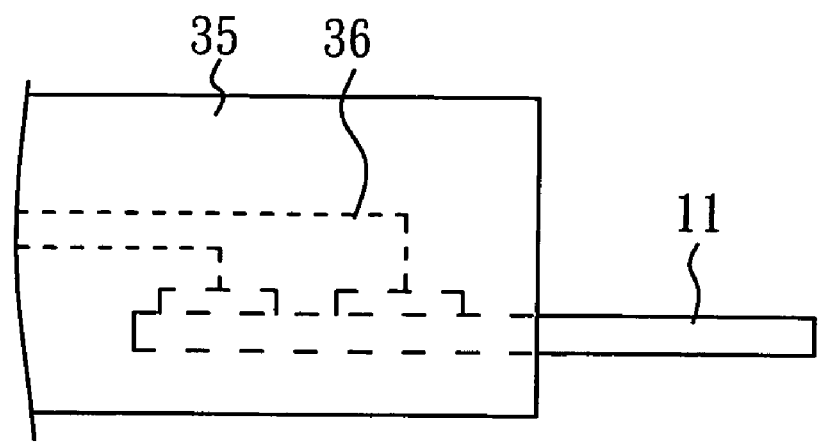
FIG. 3 is a schematic drawing of another prior art reader.
Figure 4:
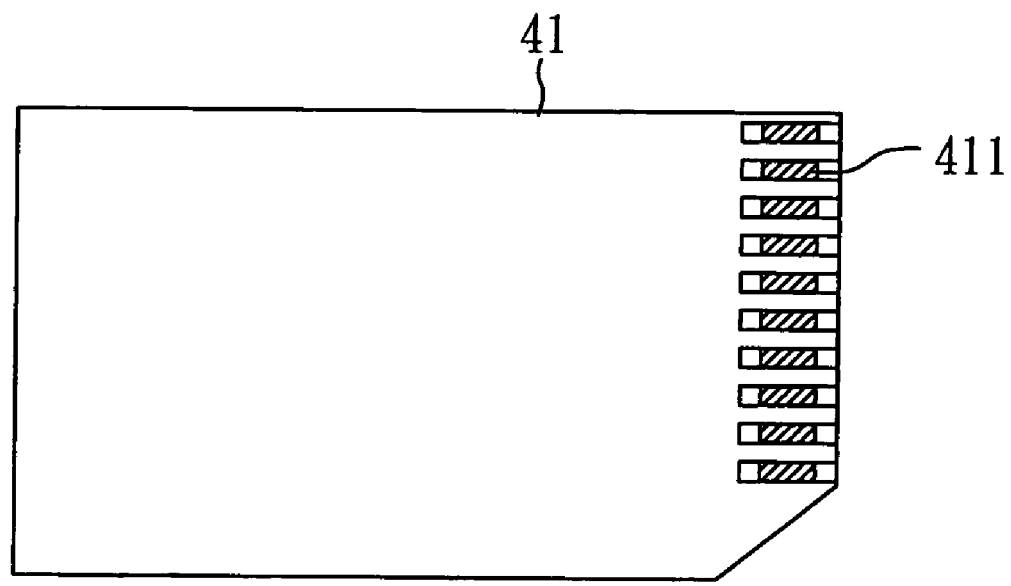
FIG. 4 is a schematic drawing of a prior art MS memory card.
Figure 5:
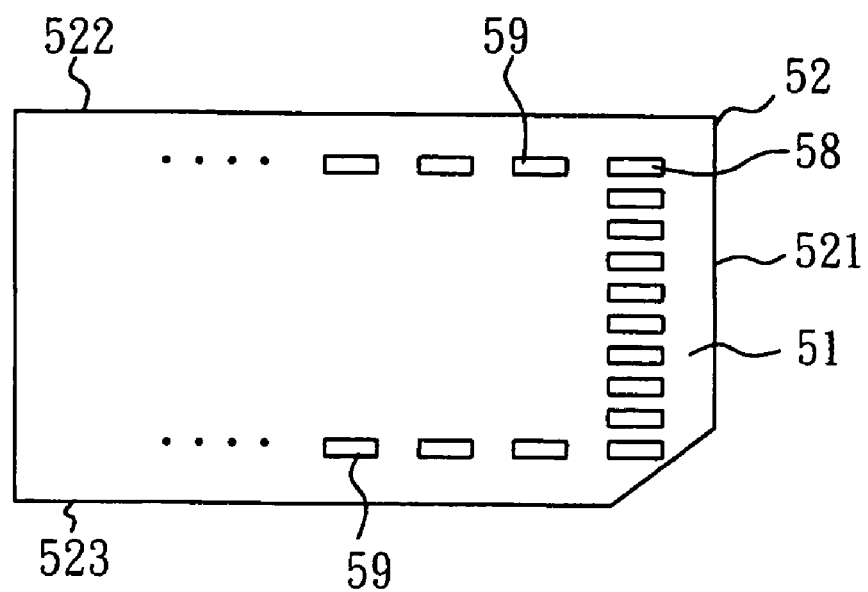
FIG. 5 is a front view of a small electronic card with peripheral contacts according to the present invention.

Please refer to FIG. 5. FIG. 5 is a front view of a small electronic card with peripheral contacts according to the present invention. In this embodiment, the small electronic card 51 is compatible with an industry-standard MS memory card 41 depicted in FIG. 4. As shown in FIG. 5, the small electronic card 51 comprises a body 52, and the body 52 has a front end 521 and two side edges 522, 523. The two side edges 522, 523 face each other, and are disposed behind two sides of the front end 521. The small electronic card 51 further comprises a plurality of front end contacts 58 and a plurality of extended contacts 59 placed on its upper surface. The plurality of extended contacts 59 are placed behind the plurality of front end contacts 58, and follow the two side edges 522, 523 so that the extended contacts 59 correspondingly face each other.

The small electronic card 51 with the extended contacts 59 can provide sufficient contacts to improve the performance of the card 51. In this embodiment, the front end contacts 58 of the small electronic card 51 are used to provide standard power, data, address and control connections, similar, for example, to the contacts 411 of the standard MS memory card 41. The extended contacts 59 of the small electronic card 51 are used for extending a number of data transmission contacts to raise the data transmission bandwidth. Furthermore, the extended contacts 59 can also be used to provide I/O functionality, as well as extended data connections.

Figure 6:
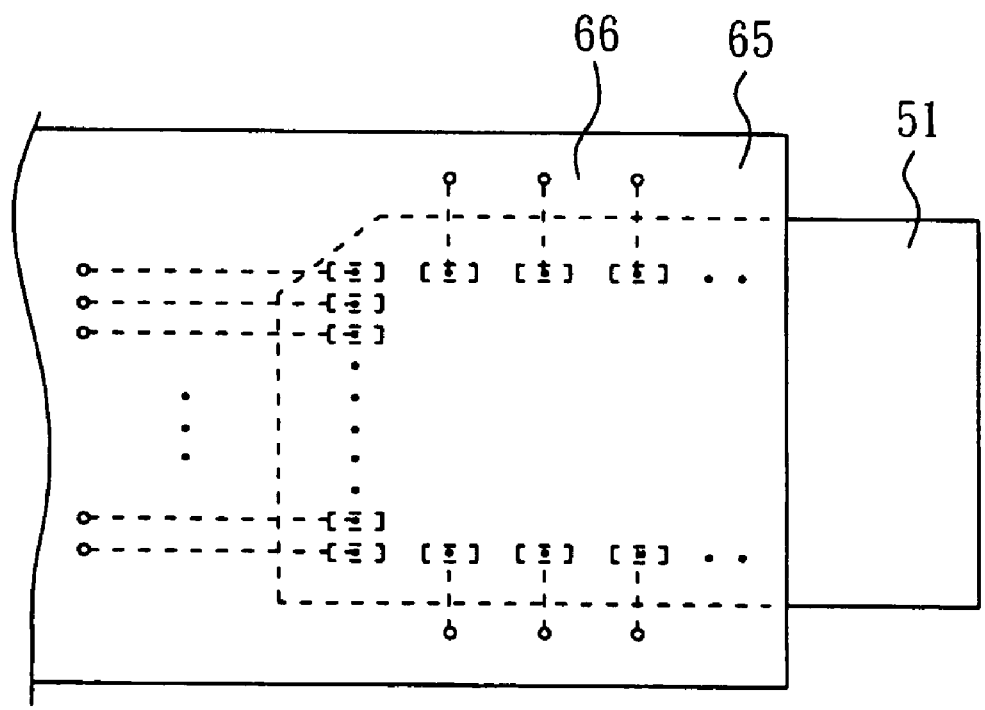
FIG. 6 is a schematic drawing of inserting the small electronic card with peripheral contacts into a reader according to the present invention.

Please refer to FIG. 6. FIG. 6 is a schematic drawing of inserting the small electronic card 51 with peripheral contacts into a reader 65 according to the present invention. The reader has a plurality of pins 66, which are placed at positions corresponding to the side edges of the body, and are used for connecting to the front end contacts 58 and the extended contacts 59 of the small electronic card 51. When the small electronic card 51 is inserted into the reader 65, the front end contacts 58 and the extended contacts 59 of the small electronic card 51 are electrically connected to their corresponding pins 66. Since the front end contacts 58 and the extended contacts 59 of the small electronic card 51 are placed around the body 52, the pins of the reader 65 are also arranged around the body 52 of the small electronic card 51. Therefore, the pins 66 are not bent, or placed on both upper and lower sides, thus reducing both manufacturing difficulties and the volume of the reader 65.

Figure 7:
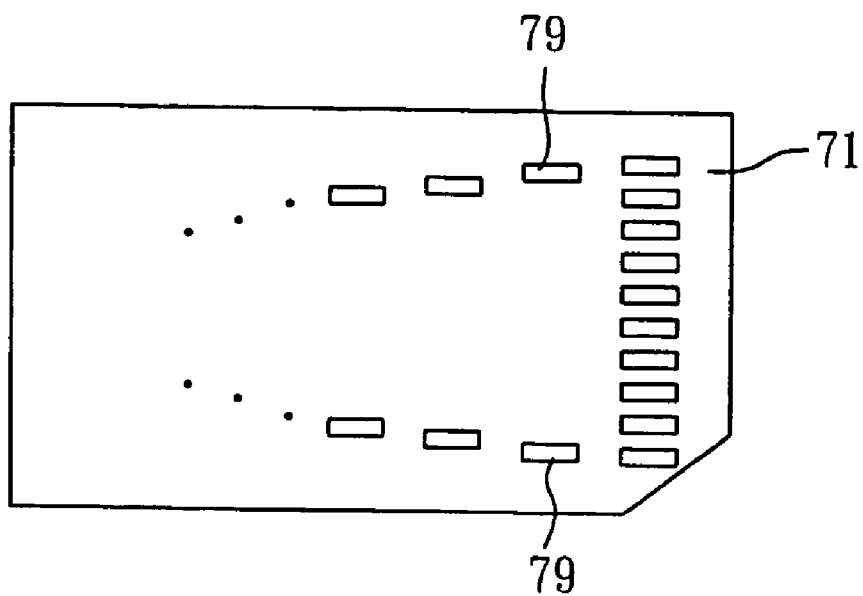
FIG. 7 is a front view of another embodiment according to the present invention.
Figure 8:
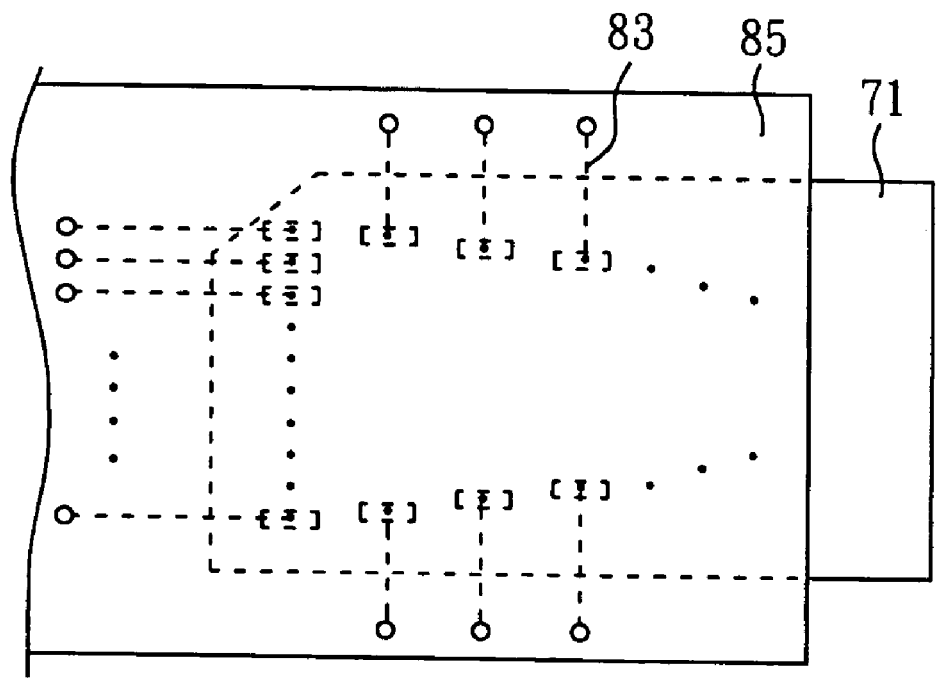
FIG. 8 is a schematic drawing of another embodiment being inserted into a reader according to the present invention.

The small electronic card 51 of this embodiment is compatible with the MS memory card 41, and thus, in addition to be inserted into a corresponding reader 65, it can also be inserted into a standard MS card slot. Moreover, the small electronic card 51 of the present invention can also be made compatible with other standard electronic cards, such as MMC cards, and SD cards. Please refer to FIG. 7 and FIG. 8. FIG. 7 is a front view of a small electronic card with peripheral contacts in accordance with another embodiment of the present invention. FIG. 8 is a schematic drawing of the small electronic card inserted into a reader. In this embodiment, the small electronic card 71 with peripheral contacts has a plurality of extended contacts 79 that taper towards each other. When the small electronic card 71 is inserted into, or pulled out from, a reader 85, because the extended contacts 79 taper towards each other, short circuit is avoided by preventing the pins 83 from touching incorrect contacts 79.

In view of the foregoing, it is known that the present invention primarily utilizes the extended contacts 79 along the two side edges to extend the total number of contacts to increase the data transmission bandwidth, and thus the data transmission speed. The arrangement of the extended contacts 79 does not affect the design of the reader, while preventing short circuit caused by pins 83 touching incorrect contacts 79.

Although the present invention has been explained in relation to its preferred embodiment, it is to be understood that many other possible modifications and variations can be made without departing from the spirit and scope of the invention as hereinafter claimed.

What is claimed is:

1. A small electronic card with peripheral contacts capable of being inserted into a reader, the small electronic card comprising:
   a body having a front end, a first side edge and a second side edge, the first and second side edges facing each other and disposed behind two sides of the front end, the body being inserted into the reader from the front end;
   a plurality of front end contacts placed along the front end of the body;
   a plurality of first extended contacts placed in a taper arrangement along the first side edge; and
   a plurality of second extended contacts placed in a taper arrangement along the second side edge.

2. The small electronic card as claimed in claim 1, wherein the front end contacts are arranged to provide standard power, data, address and control connections.

3. The small electronic card as claimed in claim 2, wherein the first and second extended contacts a rearranged to increase the number of data transmission contacts to raise a data transmission bandwidth.

4. The small electronic card as claimed in claim 2, wherein the first and second extended contacts provide I/O functionality and extended data connections.

5. The small electronic card as claimed in claim 2, wherein the front end contacts are contacts for a SD card.

6. The small electronic card as claimed in claim 2, wherein the front end contacts are contacts for a MS card.

7. The small electronic card as claimed in claim 2, wherein the front end contacts are contacts for a MMC card.

8. The small electronic card as claimed in claim 1, wherein the reader has a plurality of pins that are placed corresponding to the side edges of the body and used for electrically connecting to the plurality of extended contacts.

* * * * *